(No Model.)

G. H. THOMAS.
GRATER.

No. 429,663.   Patented June 10, 1890.

Witnesses:
James F. Duhamel
Horace A. Dodge.

Inventor:
George H. Thomas,
by Dodge and Sons,
his Attys.

UNITED STATES PATENT OFFICE.

GEORGE H. THOMAS, OF CHICOPEE FALLS, MASSACHUSETTS, ASSIGNOR, BY DIRECT AND MESNE ASSIGNMENTS, TO THOMAS C. PAGE, OF SAME PLACE, AND EMERSON GAYLORD.

GRATER.

SPECIFICATION forming part of Letters Patent No. 429,663, dated June 10, 1890.

Application filed January 25, 1890. Serial No. 338,155. (No model.)

*To all whom it may concern:*

Be it known that I, GEORGE H. THOMAS, a citizen of the United States, residing at Chicopee Falls, in the county of Hampden and State of Massachusetts, have invented certain new and useful Improvements in Graters, of which the following is a specification.

My invention relates to that class of implements or machines used for grating vegetable or similar substances; and the invention consists in so combining and arranging the grating-surface, the holder of the material, and the mechanism that imparts motion to the one or the other of said parts as to cause the one to move in an elliptical path in relation to the other, as hereinafter more fully set forth.

Figure 1:
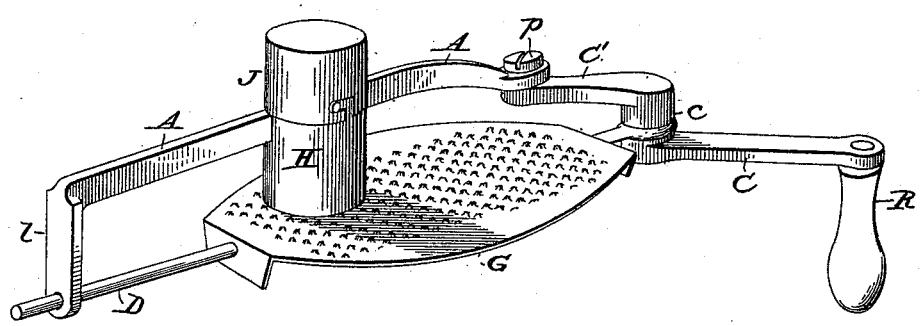
Figure 2:
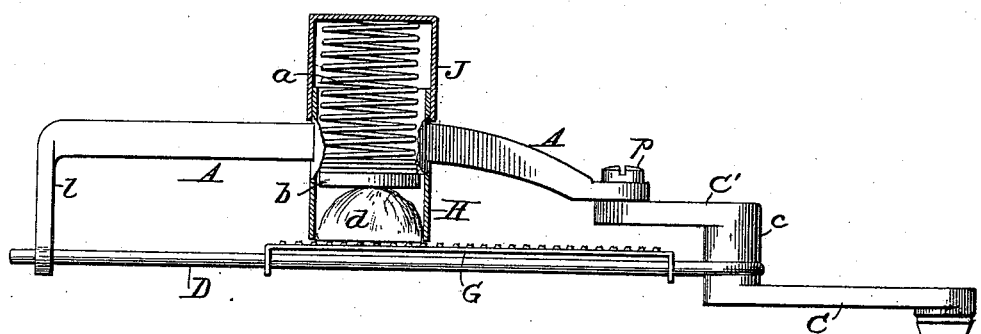
Figure 3:
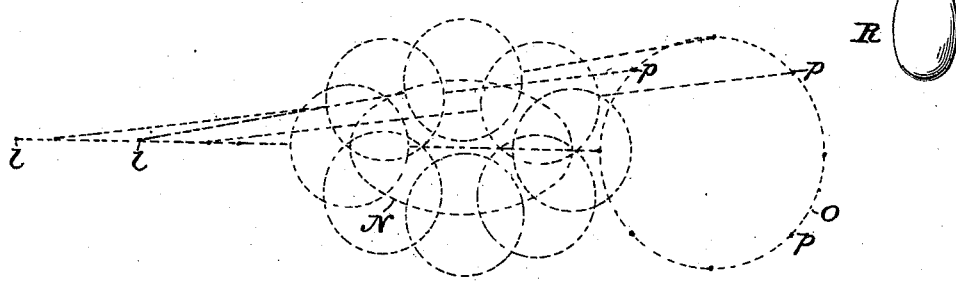

Figure 1 is a perspective view, and Fig. 2 is an edge or plan view, of my invention applied to a grater to be used by hand. Fig. 3 is a diagram illustrating the movement of the grating-surface in relation to the holder or substance being grated.

The object of this invention is to so construct a grater as to cause the teeth of the grater to travel in an elliptical path in relation to the substance on which they operate, and thus prevent the teeth from merely cutting grooves in the substance, as is the case in all graters in which the teeth and the substance being operated on move in a right line in relation to each other.

In all ordinary graters, whether the grating-surface be flat or cylindrical, the teeth being arranged to move continually in a right line necessarily operate to cut a series of longitudinal grooves or scores in the material, and as the operation is continued the material forming the ridges between these grooves is broken or rubbed off in coarse particles or small chunks, and is therefore not in that finely-comminuted condition that is desired for culinary purposes.

For the purposes of illustration I have shown my invention as applied to a hand implement adapted to grate nutmegs or any similar small article.

In the drawings, Figs. 1 and 2, A indicates a metallic bar, to which is secured the holder H for holding the article to be grated. This holder is simply an open-ended tube or box, in which is placed loosely a spiral spring $a$ and follower $b$ to press the nutmeg or other article $d$ against the teeth of the grater, the holder being provided with a cap J, provided with right-angled grooves to lock on pins, so it will be held in place with the spring and can be removed when desired, this being a well-known style of holder. At one end the bar A has an arm $l$, standing at a right angle, as shown in Figs. 1 and 2, with a hole in its end for the reception of a reciprocating rod D, to which the grating-plate G is rigidly secured, and which therefore moves with the rod D. At its opposite end this rod D is pivoted to a wrist or offset $c$, which is located nearly midway of a double-crank arm C C', as shown in Figs. 1 and 2, one end of said crank-arm being pivoted by a screw $p$ or similar means to the end of bar A, and its opposite end being provided with a crank or handle R, by which it can be turned.

It will at once be seen that when the crank-arm is turned the wrist or offset $c$ will describe a circle around the point or pivot $p$, and that as the end of rod D is connected to and carried with said wrist or offset $c$ it will also be made to move in the same circle, while its opposite end will be made to slide to and fro through the hole or bearing in arm $l$ of the bar A, the result being that the plate or grating-surface G, connected to and carried by said rod, will partake of these two movements, resulting in its moving in an elliptical path, as clearly shown in the diagram, Fig. 3, in which O indicates the circle in which the wrist $c$, with the connected end of rod D, moves, while N indicates the elliptical path or movement of the plate G.

It will be seen that the teeth of the grater, instead of moving to and fro in a right line across the nutmeg or substance $d$, are during their entire movement constantly changing their line of motion, by which means not only are they prevented from merely cutting or scoring grooves in the face of the substance against which they bear, but as each succeeding tooth operates on the substance at a slightly-different angle from the preceding one each one cuts off a minute particle, the result being that the substance as a whole is much more finely grated or comminuted, and is thus much better fitted for culinary purposes.

In the illustration the holder and bar A, being grasped and held by the hand, will of course be stationary while the grating-plate G will move; but it is obvious that this arrangement may be reversed by having the plate stationary and the holder movable, the result being the same. I prefer to arrange the rows of teeth on the plate G diagonally, as shown, as by such arrangement there is even less movement in the line of the rows than there would be if they were arranged in lines parallel with the rod D or the longer axis of the plate. Any ridges which may be formed on the substance during the movements along the longer sides of the ellipse will be removed during the movement along or around the ends of the same, as at such times the movement will be relatively at right angles to the movements along the longer sides, thus causing the teeth to cut across the ridges, if any there should be. As a matter of fact, however, such ridges cannot be formed to any perceptible extent, for the reason that the teeth are constantly changing their movement from a right line.

As previously stated, the drawings illustrate a simple form of hand-grater embodying my invention, such as would be used in households for grating nutmegs and the like. It is obvious that with this form of the grater the holder and the grating-plate may be reversed in position, or that by applying a suitable handle to the plate G, or to the rod to which it is attached, that part may be held by the hand, in which case the holder will move in the same elliptical path, the result being the same.

To make larger graters for grating cocoanuts, lemon-peel, or vegetables of any kind, as will be necessary for use by pastry-cooks in hotels and bakeries, the apparatus will be mounted on a suitable frame provided with a clamp for fastening it to the edge of a table or shelf, as is now customary with similar utensils; or, if it be desired to make still larger machines to be operated by hand or by power, the parts may be mounted on a frame provided with legs, the holder for the material being modified in any manner found necessary to adapt it to the various substances to be grated. As, however, these modifications are all within the knowledge of skilled mechanics, further description is unnecessary, the gist of the invention consisting in the elliptical movement of either the grating plate or surface, or of the holder or material to be grated, and which may be effected by various well-known forms of mechanism.

I am aware that it has been proposed to cause the holder to move in a line slightly oblique to the line of the row of teeth, and also that it has been proposed to impart to a grating-cylinder a slightly to-and-fro endwise movement while rotating, and I do not claim either of these; but,

Having thus fully described my invention, what I claim is—

1. A grater consisting of a holder for the material to be grated, a grater plate or surface for operating on the material, and mechanism arranged to impart to one of said parts an elliptical movement, substantially as and for the purpose set forth.

2. The combination, in a grater, of a holder or hopper for holding the material to be grated, a grating-plate properly located to operate on said material, and mechanism arranged to impart to one or the other of said parts an elliptical movement, substantially as described.

3. The combination of a bar or frame A and a rod D, said parts being connected at one end by a sliding joint and at the opposite end by a double crank C C', with a grater-plate secured to one of said parts and a holder secured to the other, substantially as shown and described.

In witness whereof I hereunto set my hand in the presence of two witnesses.

GEO. H. THOMAS.

Witnesses:
JAMES H. LOOMIS,
DANIEL M. KEY.